(12) United States Patent
Walton et al.

(10) Patent No.: US 11,025,025 B2
(45) Date of Patent: Jun. 1, 2021

(54) INTEGRATED OPTICS FOR HIGH ENERGY LASER APPLICATIONS

(71) Applicant: Lawrence Livermore National Security, LLC, Livermore, CA (US)

(72) Inventors: Christopher C. Walton, Oakland, CA (US); S. Mark Ammons, Oakland, CA (US); Brian Bauman, Livermore, CA (US); Robert C. Bickel, Walnut Creek, CA (US); Willem H. De Vries, Livermore, CA (US); Alexander Pertica, Livermore, CA (US); Michael Pivovaroff, Oakland, CA (US); Vincent Riot, Oakland, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 190 days.

(21) Appl. No.: 16/202,015

(22) Filed: Nov. 27, 2018

(65) Prior Publication Data
US 2020/0169055 A1    May 28, 2020

(51) Int. Cl.
| | | |
|---|---|---|
| G02B 13/00 | (2006.01) |
| G02B 3/00 | (2006.01) |
| G02B 3/02 | (2006.01) |
| G02B 17/00 | (2006.01) |
| G02B 9/00 | (2006.01) |
| H01S 3/00 | (2006.01) |
| G02B 27/09 | (2006.01) |
| G02B 5/08 | (2006.01) |
| G02B 27/30 | (2006.01) |
| G03B 21/16 | (2006.01) |

(52) U.S. Cl.
CPC ........... *H01S 3/0071* (2013.01); *G02B 5/08* (2013.01); *G02B 27/0977* (2013.01); *G02B 27/30* (2013.01); *G03B 21/16* (2013.01)

(58) Field of Classification Search
CPC ......... G02B 15/00; G02B 3/00; G02B 25/02; G02B 25/002; G02B 7/02; G02B 13/18; G02B 3/04; G02B 17/086; G02B 17/08; G02B 17/0808; G02B 5/005; G02B 3/08; G02B 13/02; G02B 13/04; G11B 7/1374; B60R 1/005
USPC ............... 359/744, 642, 800, 808, 817, 708, 359/718–720, 726, 727, 729, 730, 738, 359/739, 741, 745, 749, 796, 798
See application file for complete search history.

(56) References Cited

U.S. PATENT DOCUMENTS

| | | | |
|---|---|---|---|
| 7,843,650 B1 | 11/2010 | Roberts | |
| 9,720,223 B2 | 8/2017 | Riot et al. | |
| 2002/0136144 A1* | 9/2002 | Hatano | G11B 7/1275 369/112.23 |
| 2005/0023273 A1* | 2/2005 | Fujisawa | G03B 21/2066 219/542 |
| 2005/0105184 A1* | 5/2005 | Ma | G01N 21/3504 359/578 |

(Continued)

*Primary Examiner* — Dawayne Pinkney
(74) *Attorney, Agent, or Firm* — Perkins Coie LLP

(57) ABSTRACT

An optical laser beam director assembly is disclosed. The beam director assembly includes a monolithic optics piece formed of transparent optical material, a laser source is coupled to the monolithic optics piece to provide a laser beam to the optics piece, and a beam steerer connected to the optics piece to direct the laser beam output from the optics piece onto a target.

20 Claims, 8 Drawing Sheets

(56) References Cited

U.S. PATENT DOCUMENTS

| | | | | |
|---|---|---|---|---|
| 2005/0236584 A1* | 10/2005 | Tsuji | ............. | G03F 7/70075 250/492.1 |
| 2006/0132908 A1* | 6/2006 | Baun | ............. | G02B 7/1827 359/366 |
| 2010/0097592 A1* | 4/2010 | Kraehmer | ............. | G03F 7/70341 355/67 |
| 2015/0286145 A1* | 10/2015 | Nikipelov | ............. | G02B 17/0657 250/504 R |

* cited by examiner

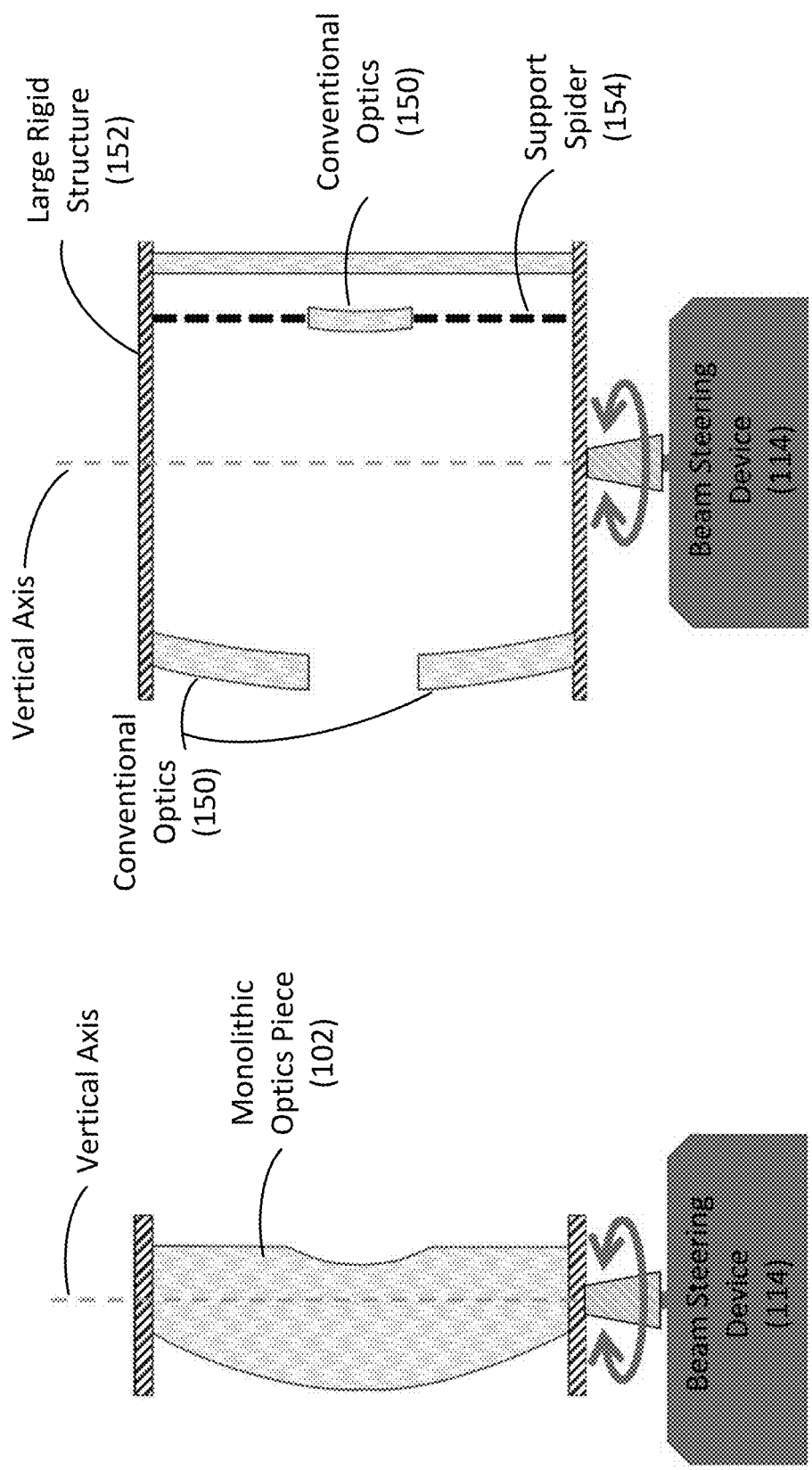

INTEGRATED OPTICS FOR HIGH ENERGY LASER APPLICATIONS

TECHNICAL FIELD

This patent document relates to systems and devices that use optics for directing a laser beam.

BACKGROUND

Lasers are optical devices that generate or amplify electromagnetic radiation to produce a laser beam. The laser beam can be directed into optical components such as lenses or mirrors that can adjust the laser beam for several applications.

SUMMARY

The optical technology disclosed in this patent document can be implemented to construct an integrated optical laser beam director assembly from a monolithic optics piece without having movable or adjustable components in the optical layout of the monolithic optics piece. A benefit of using a monolithic optics piece is that it can improve immunity to vibrations and other perturbations and it can maintain stability of the optical alignment. The monolithic optics piece can be movably coupled to a beam steering device to steer the optics piece to direct an input beam received from a laser source for various applications.

In one aspect, a beam projector comprises a monolithic optics piece, a laser source, and a beam steerer. The monolithic optics piece is formed of transparent optical material and including a first surface and a second surface opposing the first surface. The first surface includes a convex reflector surface within a central region of the first surface, and a peripheral ring-shaped region that surrounds the central region of the first surface to output a laser beam from the monolithic optics piece. The second surface includes a middle region and a concave reflector surface in a peripheral region of the second surface. The convex reflector surface of the first surface and the concave reflector surface of the second surface are configured to collectively form an optical beam director that directs the laser beam received by the middle region of the second surface along a folded optical path between the first surface and the second surface to pass through the peripheral ring-shaped region in the first surface.

The beam projector includes a laser source coupled to the monolithic optics piece to provide the laser beam to the monolithic optics piece. The beam projector also includes a beam steerer movably coupled to the monolithic optics piece to direct the output of the laser beam from the monolithic optics piece.

In some embodiments, the convex and concave reflector surfaces include a high-reflector coating comprising a first set of coated layers alternating between a high-index material layer and a low-index material layer, and the middle region and the peripheral ring-shaped region include an anti-reflective coating comprising a second set of coated layers alternating between a low-index material layer and a high-index material layer.

In an exemplary embodiment, a thickness of each high-index material layer is different from a thickness of each low-index material layer. In some embodiments, each of the high-index material layers and each of the low-index material layers have different thicknesses.

In some embodiments, the first set of coated layers include ten to fifty layers, and the second set of coated layers include two to four layers. The high-index material layer includes niobium pentoxide ($Nb_2O_5$) or tantalum pentoxide ($Ta_2O_5$), and the low-index material layer includes silicon dioxide ($SiO_2$) or magnesium fluoride ($MgF_2$).

In some embodiments, the beam steerer is configured to rotate the monolithic optics piece in an azimuth angle and in an elevation angle. In an implementation, the beam steerer comprises a gimbal.

In some embodiments, the beam projector comprises a steering mirror located in between the laser source and the monolithic optics piece to adjust one or both a direction or a focal spot of the laser beam that enters the monolithic optics piece.

In an exemplary embodiment, the beam projector further comprises a heat sink thermally coupled to the convex reflector surface or the concave reflector surface to cool the monolithic optics piece. In some embodiments, the heat sink is water cooled. In some embodiments, the monolithic optics piece includes a heat sink positioned in direct contact with the monolithic optics piece.

In some embodiments, the beam projector further comprises one or more fans located adjacent to the convex reflector surface or the concave reflector surface to provide forced air convection cooling to the monolithic optics piece.

In some embodiments, the laser source is coupled to the monolithic optics piece via an optical collimator, where the optical collimator is positioned adjacent to the middle region of the second surface. In some embodiments, the beam projector further comprises an optical fiber coupled to the laser source to deliver the laser beam from the laser source to the optical collimator.

In an exemplary embodiment, the monolithic optics piece is comprised of a front optics piece, a middle optics piece, and a rear optics piece affixed to one another by adhesive. The front optics piece is formed of the transparent optical material having a first flat surface and the second surface opposing the first flat surface, the middle optics piece is formed of the transparent optical material having a first flat surface fixed to the first flat surface of the front optics piece and a second flat surface opposing the first flat surface, and the rear optics piece is formed of the transparent optical material having the first surface and a second flat surface opposing the first surface, where the second flat surface of the rear optics piece is affixed to the second flat surface of the middle optics piece.

In some embodiments, at least a portion of each of the first surface and the second surface of the monolithic optics piece provides unobstructed access to allow direct cooling or heating of the monolithic optics piece.

These and other aspects and features are described in greater detail in the drawings, the description and the claims.

BRIEF DESCRIPTION OF THE DRAWINGS

FIGS. 1B-1C illustrate a benefit associated with beam steering of a monolithic optics piece compared to conventional optics.

Like reference numeral refer to similar features.

DETAILED DESCRIPTION

The optical designs described in this patent document provide an integrated optical laser beam director assembly from a monolithic optics piece. The optical layout of the monolithic optics piece is fixed in its configuration with desired optical alignment between the optical surfaces. Thus, the optical layout of the monolithic optics piece does not have movable or adjustable components. Such an optical design both improves immunity to vibrations and other perturbations and maintains stability of the optical alignment. In the example embodiments described below, an integrated optical laser beam director assembly includes a monolithic optics piece of a transparent material, a laser source, and a beam steering device.

Figure 1A:
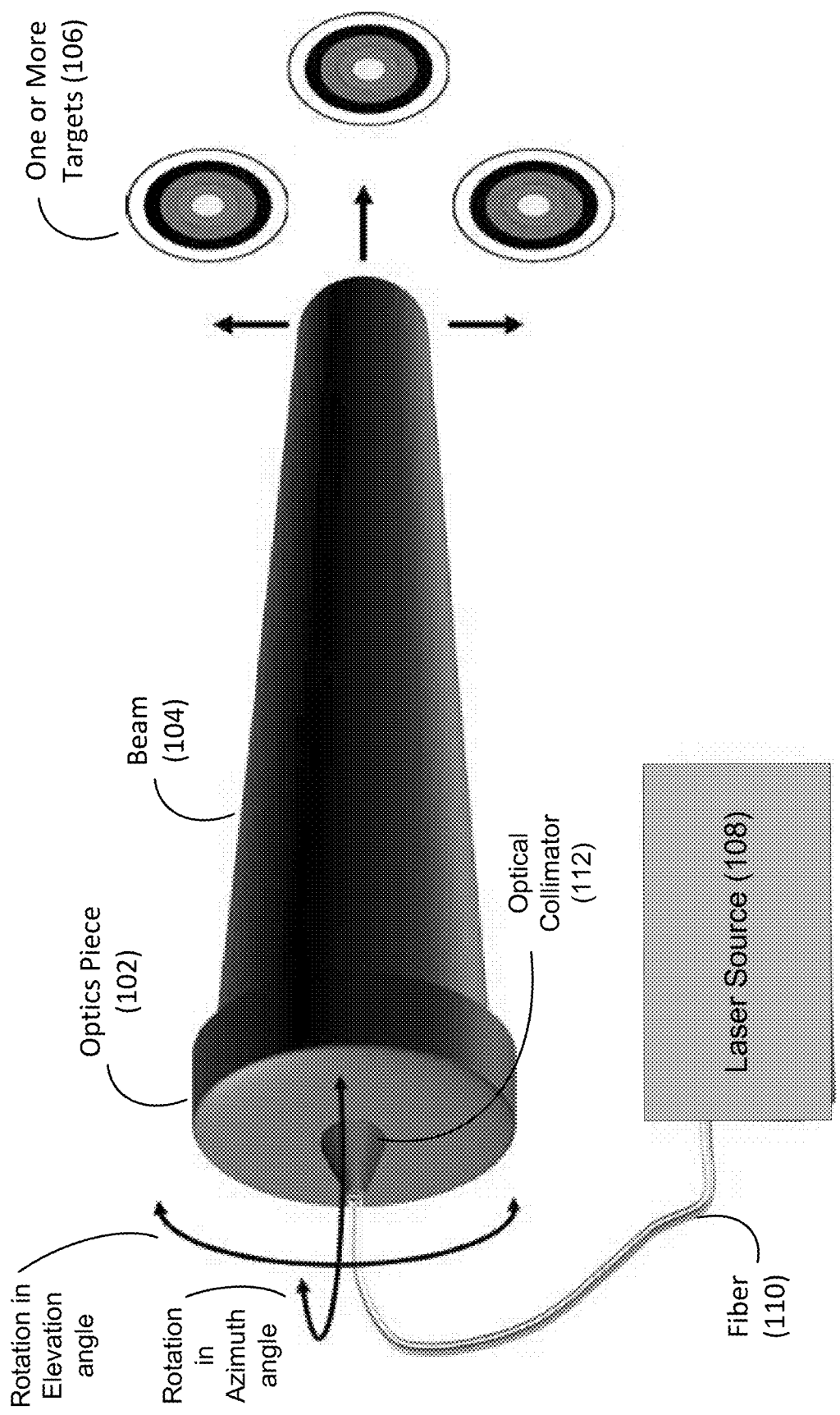
FIG. 1A shows one example of a monolithic optics piece used for a high energy laser application.

FIG. 1A shows one example of a monolithic optics piece 102 used for a high energy laser application. The monolithic optics piece 102 directs a laser beam 104 onto one or more targets 106. The laser source 108 is coupled to the optics piece 102 via a flexible fiber 110 to provide a laser beam to the optics piece 102. In operation, the incoming laser beam reflects off from both the secondary and primary mirrors of the optics piece 102 to be directed onto a target 106. The optical features of the optics piece 102 are further described in FIGS. 2A and 2B.

In some embodiments, an optical collimator may be provided between the optics piece 102 and the laser source 108 to provide a collimated laser beam to the optics piece 102. In such embodiments, the optical collimator 112 can be connected to the laser source 108 via a flexible fiber 110 so that the flexible fiber 110 feeds light to the optical collimator 112. The optical collimator 112 is located adjacent to or behind a middle region of a second surface of the optics piece 102 (further described in FIGS. 2A and 2B). In some implementations, the optical collimator 112 is in close proximity to the optics piece 102 so that the optical collimator 112 and the optics piece 102 can be positioned on the same gimbal (not shown in FIG. 1A). By the way of example and not by limitation, the optical collimator 112 may include a fiber at the focus of a lens or mirror, or a fiber glued onto a gradient-index lens. In some embodiments that do not use an optical collimator, the optics piece 102 can be designed for the properties of the laser source 108 so that the optics piece 102 receives an uncollimated laser output from the laser source 108.

FIG. 1A illustrates that the optics piece 102 can be rotated in azimuth and elevation angle to direct the laser beam 104 onto one or more targets 106. The optics piece can be movably coupled to a beam steering device (not shown in FIG. 1A) that rotates the optics piece in the azimuth and elevation angles. An example of a beam steering device is a gimballed mount.

FIGS. 1B and 1C illustrate the benefits associated with beam steering of a monolithic optics piece 102 compared to a beam steering of conventional optics 150. FIG. 1B shows a monolithic optics piece 102 movably coupled to a beam steering device 114. Compared to the conventional optics 150, the monolithic optics piece 102 has a lower distortion during steering due to the smaller and single piece design. Further, compared to the conventional optics 150 (see FIGS. 1B and 1C), the monolithic optics piece 102 does not require as much force and does not have as much steering resistance because the mass of the monolithic optics piece 102 is closer to the vertical axis. A benefit of the monolithic optics piece 102 is that it allows for a low moment of inertia. The smaller single piece design also allows for a smaller turret (not shown in FIG. 1B) which results in less turbulence-induced vibrations and less beam steering problems at high speed. In contrast to the benefits of the monolithic optics piece, the conventional optics 150 of FIG. 1C requires a large rigid structure 152 with support spider 154 to keep the optics in alignment. A large open structure is prone to distortion and vibration during rapid steering. Further, heavy objects far from the rotation axis causes high resistance to steering or high moment of inertia. Thus, stronger beam steering devices are needed to steer conventional optics 150.

In some embodiments, the beam projector described in FIG. 1A additionally includes a steering mirror (not shown) located in between the laser source 108 and the optics piece 102 to make fine adjustments to the beam direction as the beam enters the optics piece 102. The steering mirror can adjust one or both a direction or a focal spot of the laser beam that enters the optics piece 102.

The steering mirror can provide small and rapid adjustments to the beam direction to adjust the direction of the beam. For example, the steering mirror can move slightly along one or more axis (e.g., tip and/or tilt) to change the angle of the beam that is received from the fiber 110 and is incident on the optics piece 102. In some embodiments, the steering mirror may be actuated to provide 1 milliradian's worth of angle adjustment, which may be de-magnified by the optics piece 102 to 100 microradian's worth of angle travel in the case of a 10x telescope. In some embodiments, the steering mirror may additionally be used to make fine focus or focus spot adjustments for the light that enters the optics piece 102. For example, the steering mirror may move axially to adjust the focus of the beam entering the optics piece 102. The steering mirror is designed to have a low moment of inertia to allow quick movements of the mirror (e.g., via piezoelectric actuation) and is designed to include the proper cooling temperature control mechanisms to allow dissipation of heat that may be produced the laser light is incident thereon.

The steering mirror provides several benefits. For example, the steering mirror provides rapid adjustments to compensate for atmospheric effects or a quickly moving target. Furthermore, in embodiments that include both the steering mirror and the beam steering device, the steering mirror provides fine adjustments over a limited range on top of the coarse adjustments provided by the beam steering device.

Figure 2A:
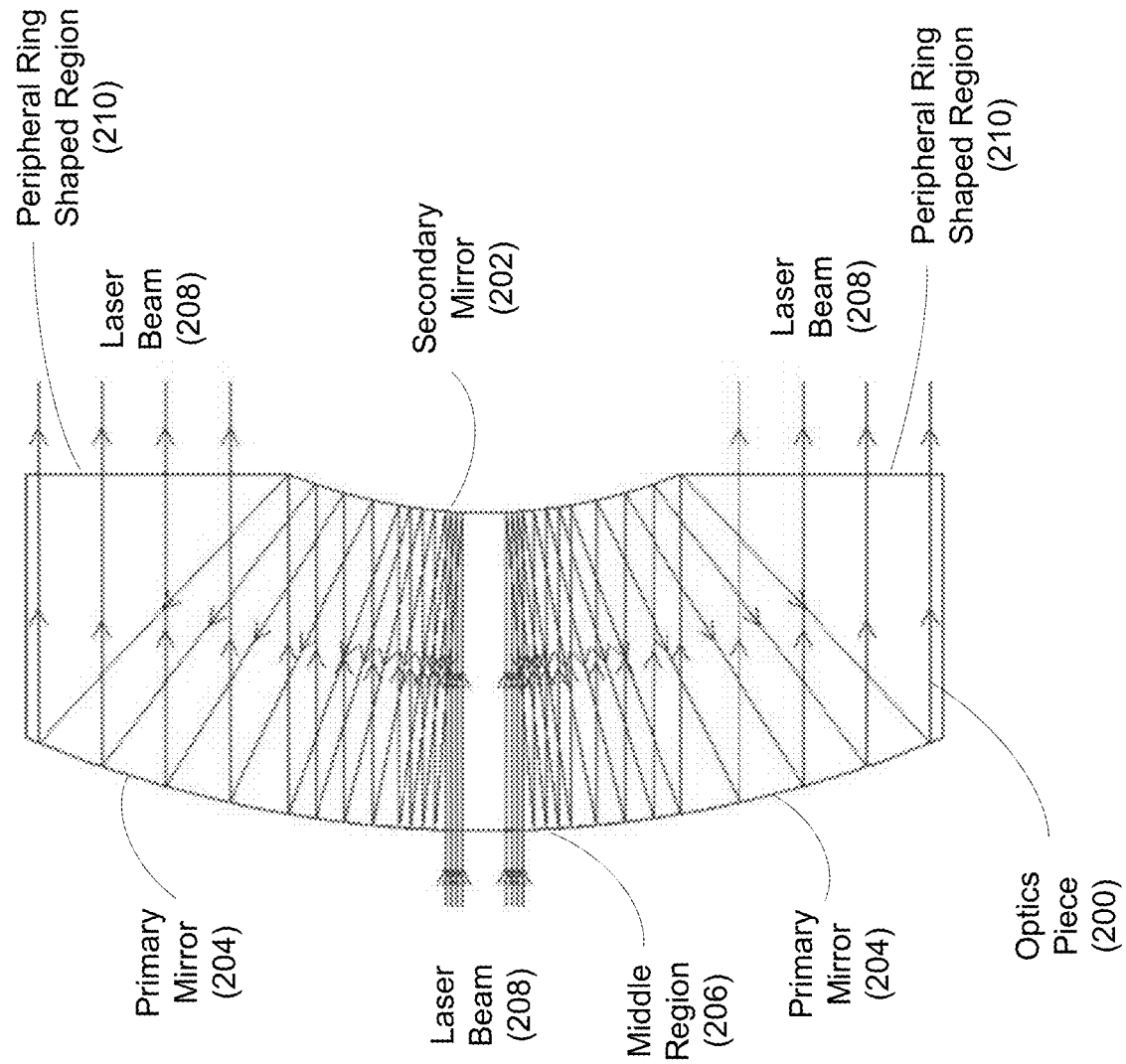
FIG. 2A shows a cross-section of the exemplary monolithic optics piece.

FIG. 2A shows a cross-section of the exemplary monolithic optics piece 200 without having movable or adjustable components in its optical layout. The optics piece 200 includes a solid glass structure that includes a first surface that includes a secondary convex mirror 202 located on one side of the solid glass structure 200, and a second surface that includes a primary concave mirror 204 located on another side of the solid glass structure and opposite to the secondary convex mirror 202. The primary mirror 204 is located at a peripheral region of the second surface, where the peripheral region surrounds the middle region 206. The second surface also includes a middle region 206 to allow a laser beam 208 from a laser beam source (not shown) to be passed through the middle region 208 and onto the first surface. The secondary mirror 202 includes a convex reflector surface within a central region of the first surface. The secondary convex mirror 202 is designed to receive a laser beam 208 from a laser source. The first surface also includes a peripheral ring-shaped region 210 that surrounds the central region of the first surface to output the laser beam 208. In some implementations, the optics piece may be manufactured of a transparent material.

The secondary convex reflector surface 202 of the first surface and the primary concave reflector surface 204 of the second surface are configured to form an optical beam director that directs the input laser beam 208 received by and passed through the middle region 206 of the second surface along a folded optical path between the first surface and the second surface to pass through the peripheral ring-shaped region 210 of the first surface. The primary and secondary mirrors can be in different optical designs and, in some implementations, they can be aspheric, e.g., a parabola or a hyperbola.

The first and second surfaces of the monolithic optics piece are coated with an optical coating further described in the section below. The primary mirror 204 is coated with a high-reflector coating and the middle region 206 of the second surface is coated with an anti-reflective coating. Further, the secondary mirror 202 is coated with a high-reflector coating and the peripheral ring-shaped region 210 is coated with an anti-reflective coating.

Figure 2B:
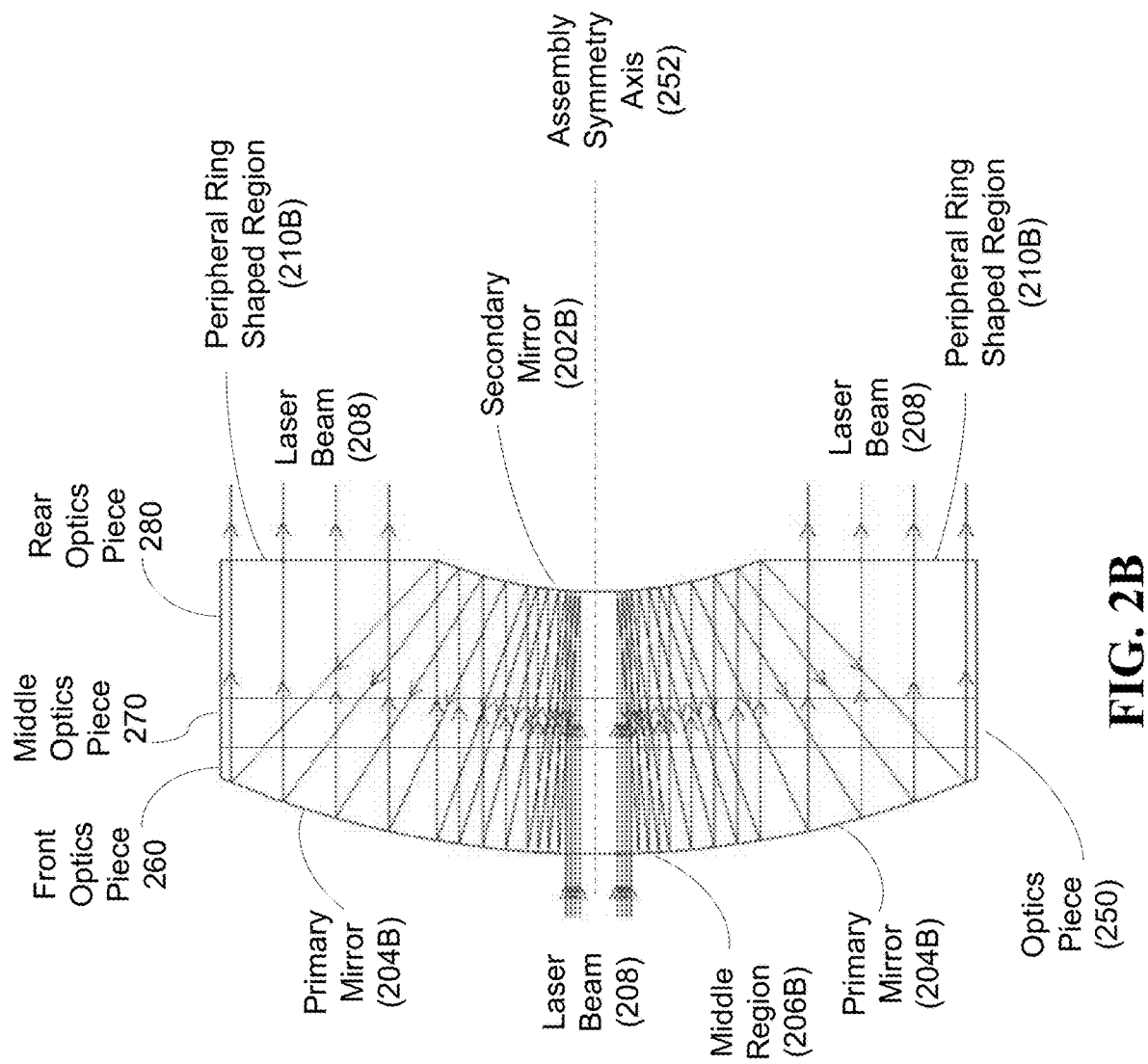
FIG. 2B shows a cross-section of another exemplary monolithic optics piece.

FIG. 2B shows a cross-section of an exemplary monolithic optics piece 250 comprising three sections but with no movable or adjustable components in its optical layout. As illustrated, the front, middle and rear optics pieces 260, 270 and 280 of a transparent material are designed to have geometries and shapes to include various optical components for the optics piece and are permanently fixed to one another by adhesive or other means as a single integrated unit (i.e., a monolithic optics piece). The front optics piece 260 is designed to receive a laser beam 208 from a laser source (not shown) to be passed through the middle region 208 and onto the first surface that includes the secondary mirror 202B. The rear optics piece 280 receives the laser beam and passes the laser beam through the peripheral ring-shaped region 210B. The middle optics piece 270 as shown in this example is a flat slab having two opposing flat surfaces for engaging the front and rear optics pieces 260 and 280. These optics pieces 260, 270 and 280 can be symmetric around a common assembly symmetry axis 252. The use of a common transparent material for the pieces 260, 270 and 280 can provide optical index match at an interface between these pieces to reduce optical loss due to reflection or distortion due to refraction and dispersion due to presence of different optical materials. Alternatively, different optical materials may be used for these pieces when desired index matching can be accommodated. The different pieces in the example in FIG. 2B, e.g., the front, middle and rear optics pieces 260, 270 and 280, can be engaged together by a suitable technique, e.g., by using suitable adhesives or cements to engage two adjacent pieces in direct contact.

In FIG. 2B, the middle optics piece 270 shown as a flat slab can be used to fine tune the distance between pieces 260 and 280 during assembly since after curing the adhesive the design cannot be adjusted. The distance between pieces 260 and 280 is selected to achieve a desired focal length or distance for the optics piece 250. During assembly, the middle flat slab piece 270 is selected from a set of flat plates of various thickness values so the selected piece has the desired thickness for the desired spacing between pieces 260 and 280. This design of using multiple pieces and the associated assembly process can provide cost reduction in comparison with a design based on a single piece material which requires expensive manufacturing process. Flat optical pieces of different thickness values can be obtained at a relatively low cost in comparison with the front and rear pieces 260 and 280 that have mirrors of curved surfaces. For example, the cost of the flat middle piece 270 may be many times, e.g., ten times less expensive than the optics pieces 260 and 280.

In some implementations of the design in FIG. 2B, if the front and rear optics pieces 260 and 280 can be made with sufficient accuracy, the front and rear optics pieces 260 and 280 may be directly engaged to each other without the middle piece 270 to achieve the desired focal length for the optics piece in FIG. 2B.

The front optics piece 260 includes a first flat surface on its right-hand side that is fixed to first flat surface of the middle optics piece 270, and a second, non-flat surface opposing the first flat surface. The second surface of the front optics piece 260 includes include a primary concave mirror 204B that is located in a peripheral region surrounding the middle region 206B of the front optics piece 260. The rear optics piece 280 includes a first surface on the right-hand side and a second flat surface on the left-hand side opposing the first surface. The second flat surface of the rear optics piece 280 is fixed to the second flat surface of the middle optics piece 270. The first surface includes a secondary convex reflector surface 202B and a peripheral ring-shaped region 210B that surrounds the central region to output the laser beam.

The middle region 206B allows a laser beam 208 from a laser beam source (not shown) to be passed through the middle region 208 and onto the first surface of the rear optics piece 208, where the first surface includes the secondary mirror 202B. The secondary convex reflector surface 202B of the rear optics piece 280 and the primary concave reflector surface 204B of the front optics piece 260 are configured to form an optical beam director that directs the input light received by the middle region 206B of the front optics piece 260 along a folded optical path between the first surface of the rear optics piece 280 and the second surface of the front optics piece 260 to pass through the peripheral ring-shaped region of the first surface of the rear optics piece 280. In this optical beam director, the primary concave reflector surface 204B is the primary mirror and the secondary convex reflector surface 202B is the secondary mirror. The reflector surfaces 202B and 204B can be aspheric, e.g., a parabola or a hyperbola.

The adhesive layer for engaging the three optics pieces 260, 270 and 280 can be implemented with selective adhesive materials including some that can be UV cured. The index of refraction, the adhesive bonding strength and other material properties such as the thermal expansion coefficient and degassing property should meet the requirements of the operation conditions of the optical beam director. Optically, the index refraction of the adhesive should match that of the optics pieces 260, 270 and 280. For space-related applications, the bonding strength of the adhesive layer should be sufficient to withstand the g-force experienced by the optical beam director in deployment. One example of commercial adhesive materials is Norland optical adhesive NOA88.

Figure 3:
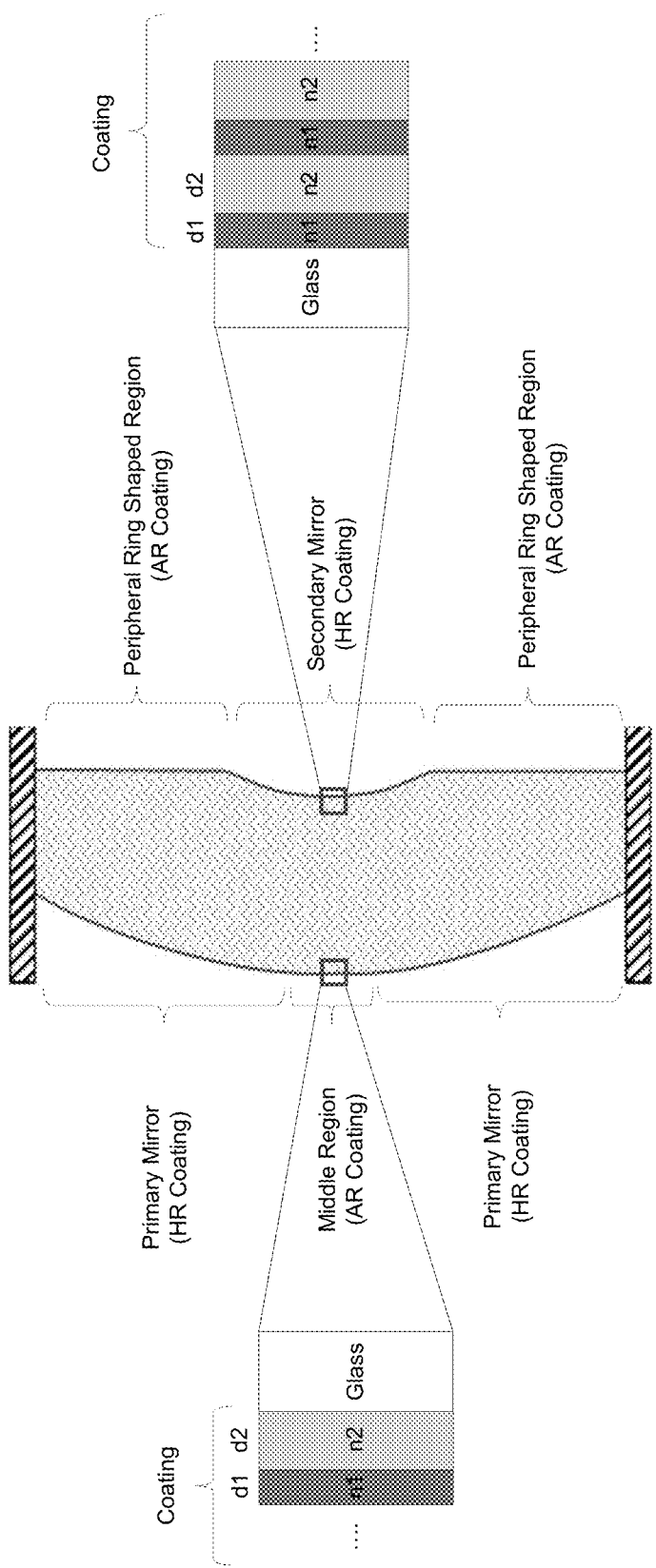
FIG. 3 shows an example of an optical coating for the first and second surfaces of the monolithic optics piece.

FIG. 3 shows an example of an optical coating the first and second surfaces of the monolithic optics piece. Dielectric coating is typically used to achieve a low or high reflectance on the surface of the monolithic optics piece. The first and second surfaces of the monolithic optics piece are coated with layers alternating between a high-index material (n1 in FIG. 3) and a low-index material (n2 in FIG. 3) typically deposited by evaporation or sputtering. A high-reflector (HR) coating can include a first set of alternating layers that can achieve reflectance of more than 99.9% at a single wavelength of the laser. In some implementations, the HR coating can include ten to fifty alternating layers. An anti-reflective (AR) coating can include a second set of alternating layers that can reduce the reflectance to less than 0.1% at a single wavelength of the laser. In some implementations, the AR coating can include two to four alternating layers. In absorption, a high-quality commercially-available coating can achieve approximately 5 ppm absorbed in the AR coating and approximately 30 ppm absorbed in the HR coating. Examples of high-index materials include niobium pentoxide ($Nb_2O_5$) and tantalum pentoxide ($Ta_2O_5$). Examples of low-index materials include silicon dioxide ($SiO_2$) and magnesium fluoride ($MgF_2$).

The thickness of the high-index material (d1) and the low-index material (d2) can be different to achieve a desired high or low reflectance. The layer thicknesses are chosen so that light reflected at the buried layer boundaries add or cancel to give the desired high or low reflectance at the desired wavelength. In some implementations, the layer stack can be periodic so that all layers have the same thickness. In some implementations, the layers can have an aperiodic stack so that the layers have varying thicknesses that may be all different. The choice of layer thickness depends on the complexity of the need such as reflectance at a single wavelength or reflectance at a continuous band of wavelengths. In some embodiments as shown in FIG. 3, the thicknesses d1 of the high-index material layers are different from the thicknesses d2 of the low-index material layers. In some embodiments, the thicknesses of each of the high-index material layers and each of the low-index material layers are different.

An uncoated glass can reflect about 4% of visible light at normal incidence. This would be undesirable for certain applications, such as high-energy lasers. As an example, for a 100 kW laser, an uncoated glass may reflect back 4$k$W towards the fiber and into the laser source. A benefit of the coating technology described in this patent document is that it can minimize the amount of energy reflected back into the laser. Further, in some implementations, the maximum power density can be approximately 5 kW/cm$^2$. AR and HR coatings can be implemented at ten times this threshold.

The monolithic design of the optics piece provides several advantages for high energy laser applications. Using the exemplary monolithic optics piece can lead to an economical system that is robust to a wide variety of environments, including large temperature changes or g-forces resulting from a rocket launch. As further described in the sections below, the compact nature of the monolithic optics piece allows for a low moment of inertia, which enables high slew-rate applications that can allow the optics piece to quickly steer the laser beam. The monolithic design of the optics piece can allow for better thermal management from the laser beam, as further explained in the sections below. The monolithic design of the optics piece can also allow for long focal lengths.

Figures 4A, 4B:
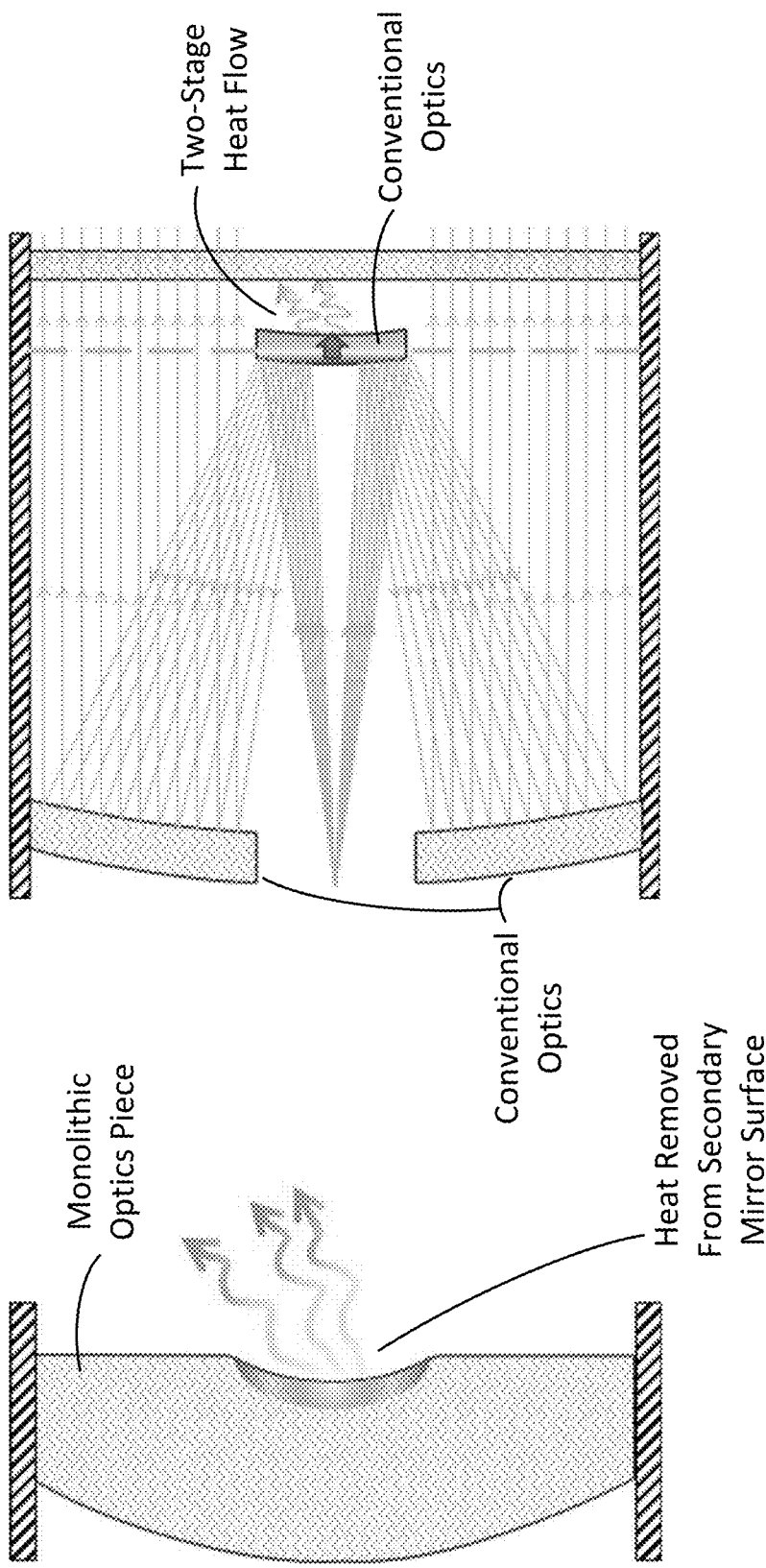
FIGS. 4A-4B illustrate a thermal management benefit associated with a monolithic optics piece compared to conventional optics.

FIGS. 4A and 4B illustrate a thermal management benefit associated with a monolithic optics piece compared to conventional optics. FIG. 4A shows a monolithic optics piece where a laser beam is received by a secondary convex mirror. The surface that includes the secondary mirror tends to be the hottest optical surface as a result of heat generated by the laser beam hitting the secondary mirror. However, compared to conventional optics, a compact monolithic optics piece allows for a more efficient cooling because heat can be removed directly from the back of the secondary mirror surface where the heat is generated. Further, convective cooling can operate directly at the surface being heated. In contrast to the thermal management benefits of the monolithic optics piece, the conventional optics of FIG. 4B employs conductive cooled operating through the body of the secondary. Accordingly, heat flow in a conventional optics involves a two-stage process. Heat is first conducted through the optics, and then removed from the back surface. A longer thermal path for conventional optics slow heat conduction and results in an inefficient thermal management compared to the monolithic optics piece.

Figure 4C:
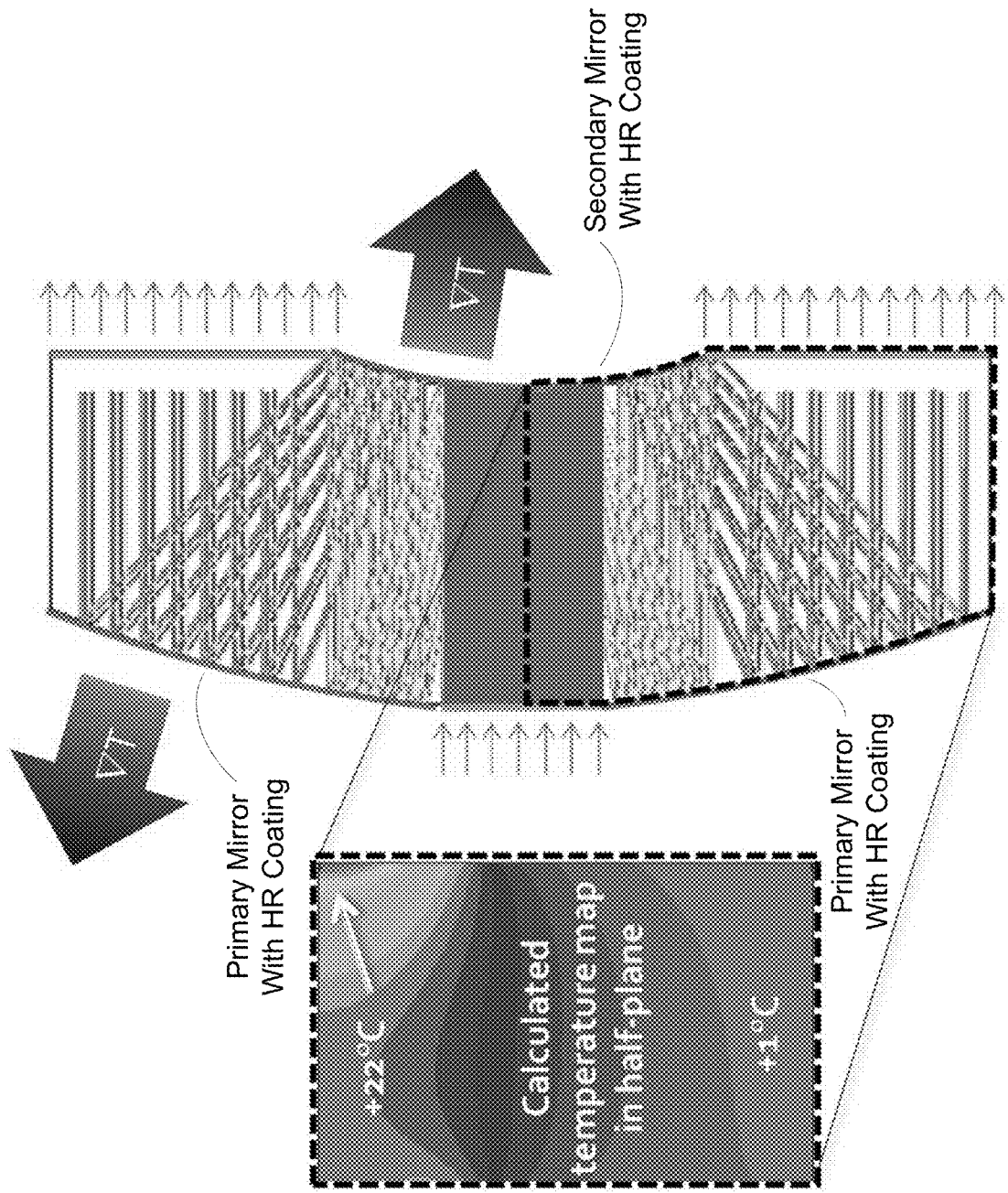
FIG. 4C shows a heat-load model of the monolithic optics piece.

FIG. 4C shows a heat-load model of the monolithic optics piece. The heat-load model was generated using, for example, a 100 kW average power laser at 1 micron wavelength with a forced air convection cooling and a coating absorption. Heat is generated by the laser beam reflecting off of the primary and secondary mirrors. The temperature map in FIG. 4C shows that the majority of heating occurs at the first HR coating of the secondary mirror. The heat-load model shows that, at 100 kW without any active cooling, the steady state temperature of the optics piece in this implementation can be approximately 25° C. above ambient temperature. However, in systems that use the disclosed monolithic optics piece, unlike conventional systems, the space behind the primary and secondary mirrors is a free surface, and is available for direct cooling or heating of the monolithic optics piece. Based on this feature, in some example embodiments, the primary and secondary mirrors are cooled using vanes or a heat sink that are thermally coupled directly to either the primary mirror, or the secondary mirror, or to both the primary and secondary mirrors. An example of a heat sink used for optical elements in high-power lasers includes a finned aluminum block thermally coupled to the primary mirror or the secondary mirror by a thermal paste.

Additionally, in some implementations, one or more cooling fans can be located adjacent to the primary mirror, or the secondary mirror, or both the primary and secondary mirrors to provide forced air convection cooling for the heat sink or the monolithic optics piece. Alternatively, in some implementations, instead of air cooling, the primary and secondary mirrors may be water cooled to provide additional heat sinking, with water circulating through the heat sink coupled to the primary or secondary mirror.

Figure 5A:
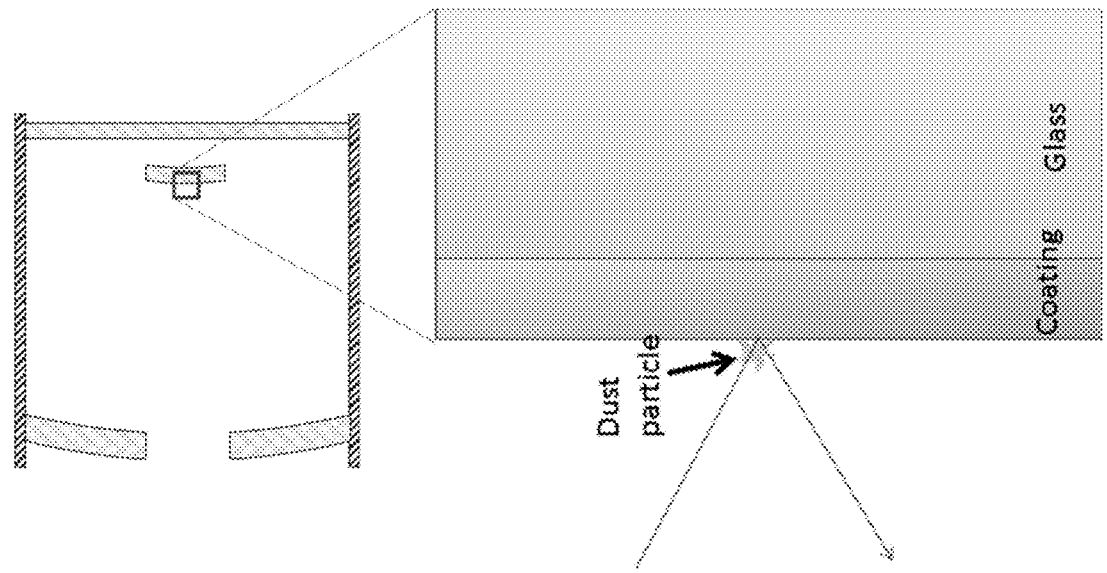
FIGS. 5A-5B show a dust and contamination resistance benefits of the monolithic optics piece compared to conventional optics.
Figure 5B:
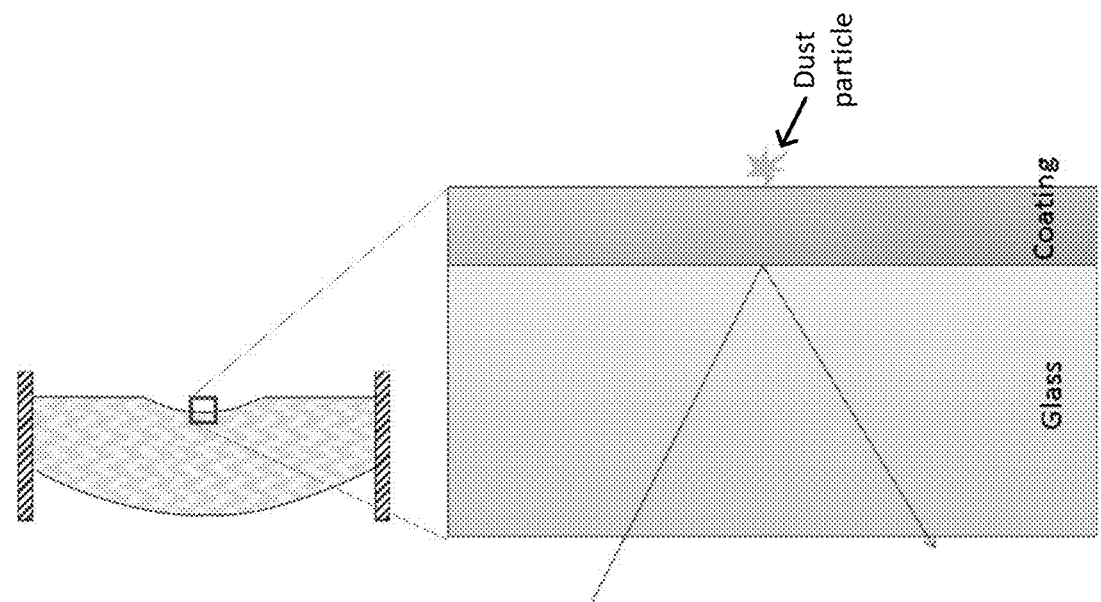

FIGS. 5A and 5B show dust and contamination resistance benefits of the monolithic optics piece compared to conventional optics. FIG. 5A shows an expanded area of the secondary convex mirror of the monolithic optics piece. The expanded region of FIG. 5A shows a glass receiving a laser beam and a coating behind the glass structure. The active reflection surface of the secondary convex mirror can be buried and protected. As a result, a dust particle can only reach the back of the coating where the thermal energy is lower compared to the conventional optics, thereby reducing the chance of the dust particle damaging the coating. The conventional optics of FIG. 5B shows an expanded area of the secondary convex mirror. The expanded region of FIG. 5B shows a coating in front of the glass structure and exposed to the environment. Any dust that arrives on or near the coating of the conventional optics arrives on or near the active reflection surface where the thermal energy can be high. A dust particle arriving on or near the active reflection surface can absorb light and can vaporize, thereby increasing its chances of damaging the coating.

The above described integrated optical designs can be used for directing a laser beam from a satellite or a moving platform due to their compact size, resistance of the optical alignment to shocks and vibrations, and their improved thermal management.

In this patent document, the word "exemplary" is used to mean serving as an example, instance, or illustration. Any embodiment or design described herein as "exemplary" is not necessarily to be construed as preferred or advantageous over other embodiments or systems. Rather, use of the word exemplary is intended to present concepts in a concrete manner.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A beam projector, comprising:
   a monolithic optics piece formed of transparent optical material and including a first surface and a second surface opposing the first surface,
   wherein the first surface includes a convex reflector surface within a central region of the first surface and a peripheral ring-shaped region that surrounds the central region of the first surface,
   wherein the central region of the first surface is configured to receive a first collimated laser beam and the peripheral ring-shaped region is configured to output a second collimated laser beam from the monolithic optics piece,
   wherein the first and the second collimated laser beams have different beam sizes,
   wherein the second surface includes a middle region and a concave reflector surface in a peripheral region of the second surface, and
   wherein the convex reflector surface of the first surface and the concave reflector surface of the second surface are configured to collectively form an optical beam director that directs the first collimated laser beam received by the middle region of the second surface along a folded optical path between the first surface and the second surface to pass through the peripheral ring-shaped region in the first surface,
   wherein the convex reflector surface is configured to receive reflected beams from the central region of the first surface;
   a laser source coupled to the monolithic optics piece to provide the first collimated laser beam to the monolithic optics piece; and
   a beam steerer movably coupled to the monolithic optics piece to direct the second collimated laser beam output from the monolithic optics piece.

2. The beam projector of claim 1, wherein
   the convex and concave reflector surfaces include a high-reflector coating comprising a first set of coated layers alternating between a high-index material layer and a low-index material layer, and
   the middle region and the peripheral ring-shaped region include an anti-reflective coating comprising a second set of coated layers alternating between a low-index material layer and a high-index material layer.

3. The beam projector of claim 2, wherein a thickness of each high-index material layer is different from a thickness of each low-index material layer.

4. The beam projector of claim 2, wherein each of the high-index material layers and each of the low-index material layers have different thicknesses.

5. The beam projector of claim 2, wherein the first set of coated layers include ten to fifty layers.

6. The beam projector of claim 2, wherein the second set of coated layers include two to four layers.

7. The beam projector of claim 2, wherein the high-index material layer includes niobium pentoxide ($Nb_2O_5$) or tantalum pentoxide ($Ta_2O_5$).

8. The beam projector of claim 2, wherein the low-index material layer includes silicon dioxide ($SiO_2$) or magnesium fluoride ($MgF_2$).

9. The beam projector of claim 1, wherein the beam steerer is configured to rotate the monolithic optics piece in an azimuth angle and in an elevation angle.

10. The beam projector of claim 1, wherein the beam steerer comprises a gimbal.

11. The beam projector of claim 1, comprising:
    a steering mirror located in between the laser source and the monolithic optics piece to adjust one or both a direction or a focal spot of the first collimated laser beam that enters the monolithic optics piece.

12. The beam projector of claim 1, further comprising:
    a heat sink thermally coupled to the convex reflector surface or the concave reflector surface to cool the monolithic optics piece.

13. The beam projector of claim 12, wherein the heat sink is water cooled.

14. The beam projector of claim 1, wherein the monolithic optics piece includes a heat sink positioned in direct contact with the monolithic optics piece.

15. The beam projector of claim 1, further comprising:
    one or more fans located adjacent to the convex reflector surface or the concave reflector surface to provide forced air convection cooling to the monolithic optics piece.

16. The beam projector of claim 1, wherein the laser source is coupled to the monolithic optics piece via an optical collimator, wherein the optical collimator is positioned adjacent to the middle region of the second surface.

17. The beam projector of claim 16, further comprising an optical fiber coupled to the laser source to deliver the first collimated laser beam from the laser source to the optical collimator.

18. The beam projector of claim 1,
wherein the monolithic optics piece is comprised of a front optics piece, a middle optics piece, and a rear optics piece affixed to one another by adhesive,
wherein the front optics piece is formed of the transparent optical material having a first flat surface and the second surface opposing the first flat surface,
wherein the middle optics piece is formed of the transparent optical material having a first flat surface fixed to the first flat surface of the front optics piece and a second flat surface opposing the first flat surface, and
wherein the rear optics piece is formed of the transparent optical material having the first surface and a second flat surface opposing the first surface, wherein the second flat surface of the rear optics piece is affixed to the second flat surface of the middle optics piece.

19. The beam projector of claim 1, wherein at least a portion of each of the first surface and the second surface of the monolithic optics piece provides unobstructed access to allow direct cooling or heating of the monolithic optics piece.

20. An optical laser beam director assembly, comprising:
a monolithic optics piece formed of transparent optical material and including a first surface and a second surface opposing the first surface,
wherein the first surface includes a convex reflector surface within a central region of the first surface and a peripheral ring-shaped region that surrounds the central region of the first surface,
wherein the central region of the first surface is configured to receive a first collimated laser beam from a laser source and the peripheral ring-shaped region is configured to output a second collimated laser beam from the monolithic optics piece,
wherein the first and the second collimated laser beams have different beam sizes,
wherein the second surface includes a middle region and a concave reflector surface in a peripheral region of the second surface, and
wherein the convex reflector surface of the first surface and the concave reflector surface of the second surface are configured to collectively form an optical beam director that directs the first collimated laser beam received by the middle region of the second surface along a folded optical path between the first surface and the second surface to pass through the peripheral ring-shaped region in the first surface,
wherein the convex reflector surface is configured to receive reflected beams from the central region of the first surface; and
a beam steerer movably coupled to the monolithic optics piece to direct the second collimated laser beam output from the monolithic optics piece.

* * * * *